United States Patent [19]
Tatsuno et al.

[11] 3,980,405
[45] Sept. 14, 1976

[54] CATHODE-RAY TUBE PICTURE PROJECTION APPARATUS

[75] Inventors: Yujiro Tatsuno; Takatoshi Ikeda, both of Hitachi, Japan

[73] Assignee: Hitachi, Ltd., Japan

[22] Filed: Sept. 13, 1974

[21] Appl. No.: 505,778

[30] Foreign Application Priority Data
Sept. 17, 1973  Japan.............................. 48-103789
Feb. 8, 1974    Japan.............................. 49-15492

[52] U.S. Cl............................. 355/20; 178/7.85; 355/52
[51] Int. Cl.².................. G03B 27/76; G03B 27/78; G03B 27/68; H01J 29/89
[58] Field of Search ................... 355/20, 1, 72, 52; 178/7.85

[56] References Cited
UNITED STATES PATENTS

| | | |
|---|---|---|
| 3,194,142 | 7/1965 | Black, Jr................................ 355/1 |
| 3,227,059 | 1/1966 | Craig................................ 355/20 X |
| 3,608,452 | 9/1971 | Conrad et al........................ 355/20 |
| 3,800,085 | 3/1974 | Ambats et al........................ 178/7.85 |
| 3,836,926 | 9/1974 | Seitz et al........................ 355/20 X |

Primary Examiner—Richard A. Wintercorn
Attorney, Agent, or Firm—Craig & Antonelli

[57] ABSTRACT

To prevent a picture of cathode-ray tube, which picture is projected through an optical lens system from being imaged with a deformed shape on a flat plane because of the curved phosphor screen of cathode-ray tube, an optical lens system is provided having imaging characteristics such that the central portion of an image formed thereby is convex toward the optical lens system.

6 Claims, 11 Drawing Figures

CATHODE-RAY TUBE PICTURE PROJECTION APPARATUS

BACKGROUND OF THE INVENTION

1. Field of the Invention

The present invention relates to an apparatus for projecting a picture of cathode-ray tube, and more paticularly to such an apparatus for correctly projecting a picture displayed on the curved phosphor screen of cathode-ray tube upon a flat plane.

2. Description of the Prior Art

Recently, a technique has been utilized widely in which a picture displayed on a cathode-ray tube (hereinafter referred to as CRT) is projected upon a screen or a recording surface. In general, since the phosphor screen of CRT does not take the form of a flat plane but takes the form of a curved surface (in many applications, a spherical surface), the picture displayed is commensurate with the curved surface. The curved picture is projected upon a flat screen or recording surface. In such a case, the focal point of the optical lens system is matched with respect to the central portion of the picture, and the peripheral portion thereof is not focussed. If the focal point of the optical lens system is matched with respect to the peripheral portion of the picture, the central portion thereof is not focussed. For this reason, with this type of projection apparatus it has been a practice to use a CRT having the phosphor screen whose curved surface approaches as close to a flat plane as possible. However, such an approach is often disadvantageous from technical and economical standpoints of view. More particularly, an enclosure of a CRT which is evacuated at high vacuum degree is required to be strong enough for withstanding atmospheric pressure and in addition, the phosphor screen advantageously has a curved surface since a phosphor material is coated on the CRT panel by precipitating a suspension. In a CRT of 7 inch screen size, for example, the curvature radius of its phosphor screen is considered 1 m at most. Further, if the phosphor screen takes the form of a flat plane, the diameter of a bright spot, which luminesces under bombardment of electron beams, increases at the peripheral portion of CRT screen. This means that a high resolution display cannot be attained over the entire screen. Still further, since the quantity of light is decreased at the peripheral portion of the screen as compared to the central portion thereof, uniform illumination cannot be obtained.

SUMMARY OF THE INVENTION

An object of the present invention is to provide a projection upon a flat plane apparatus capable of correctly projecting a picture which is displayed on a curved surface plane.

Another object of the invention is to provide a projection apparatus capable of correctly projecting a picture displayed on the CRT phosphor screen upon a flat plane.

Yet another object of the invention is to provide a projection apparatus capable of allowing a CRT to display on its phosphor screen a picture of brightness suitable for the projection and of correctly projecting the picture thus displayed upon a flat plane.

Yet another object of the invention is to provide a projection apparatus suitable for projecting a picture upon a photosensitive recording medium.

Yet another object of the invention is to provide an inexpensive projection apparatus.

The present invention is characterized in that an optical lens system for projecting a picture displayed on a curved surface upon an ideal (flat) imaging plane has such imaging characteristics that the central portion of an image formed thereby is convex toward the optical lens system.

DETAILED DESCRIPTION OF THE PREFERRED EMBODIMENTS

Figure 1:
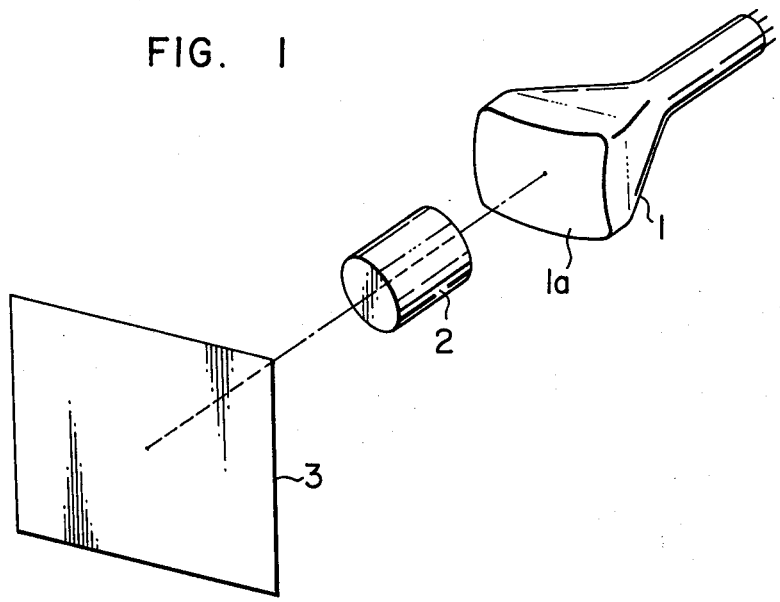
FIG. 1 is a diagramatic representation useful to explain the principle of a CRT picture projection apparatus.

As shown in FIG. 1, a CRT picture is projected upon an imaging plane 3 through an optical lens system 2. In the figure, the optical axis of the lens system 2 is aligned in line, but otherwise it may be refracted by means of a mirror interposed on the axis dependent on a relation between the situation of a CRT 1 and that of the imaging plane 3. In the case where the CRT picture is seen by eyes, the imaging plane 3 should be a screen. In accordance with this invention, the optical lens system 2 has such imaging characteristics that an image formed on the imaging plane 3 is convex at its central portion toward the optical system 2. Thus, as to be described later, adverse affect of curved display screen 1a of the CRT 1 upon the image formation is compensated for and the CRT picture can correctly be projected upon the imaging plane 3.

Figure 2:
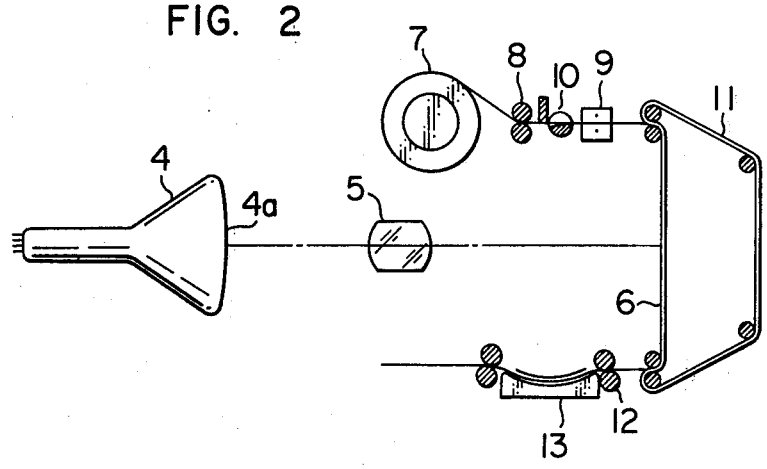
FIG. 2 is a schematic diagram of a CRT picture recording apparatus.

As shown in FIG. 2, a picture recording device comprises a CRT 4 which includes a spherical phosphor surface of a predetermined curvature and to which an external electric signal is applied so that a picture is displayed on the spherical phosphor surface. A picture thus displayed on the CRT 4 is subjected to an image formation on the imaging plane 6. Numeral 7 designates a recording paper, for example for use in xerography, which is fed out by rollers 8 and then severed into a predetermined size by a cutter 10. The recording paper 7 is charged with electricity uniformly by a charger 9 before it is exposed to light and thereafter carried on a transport belt 11 so as to be situated at the imaging plane 6. A picture of the CRT 4 is directed through an optical lens system 5 towards the recording paper 7 to expose its photosensitive surface, and a charged latent image corresponding to the picture of the CRT 4 is obtained.

The recording paper 7 thus exposed is again transported by means of the belt 11 and the rollers 12 to a developer 13 where the charged latent image is converted into a visible image, and the recording paper 7 now bearing the visible image is projected outside the picture recording device.

With this device, in order to display, on one picture frame of the CRT 4, either 1000 to 2000 words of English letters (characters) and numerals or 200 to 300 words of Japanese letters containing Chinese letters and to record them on a recording paper through an optical lens system, the CRT 4 is need to have a notably high resolution power.

The phosphor screen of the CRT 4, for example 7 inch high resolution CRT, takes a form of spherical surface of about 800 mm curvature. In this case, the amount of deviation of the phosphor screen from the tangential plane is about 3.1 mm at a point spaced 70 mm from the center (optical axis) of picture.

On the other hand, where a picture of such CRT 4 is recorded at magnification of about 1.5 (this magnification corresponds to an enlargement up to A5-size sheet) and the exposure time is set to several seconds, it is desirable to determine the aperture ratio of the lens 5 to about 4.0.

When a lens having an aperture ratio of 4.0 and focal distance of 135 mm is used at magnification of 1.5 on the assumption that the lens has no aberration and it can project an object on an ideal flat plane upon an ideal flat imaging plane, it is possible to obtain a resolution power of 5/mm on a picture of CRT 4 within the range of a deviation from the tangential plane of 1.3 mm. Accordingly, the CRT 4 as described above having a phosphor screen of 800 mm radius cannot satisfy this condition.

In order to confine the deviation from an ideal imaging plane within 1.3 mm at a point spaced from the center of picture, i.e. from the optical axis of lens, a commensurate curvature radius of the phosphor screen of the CRT 4 therewith is calculated to be about 1880 mm. Therefore, in further consideration of lens aberrations which have been assumed to be negligible, it is difficult to manufacture the CRT 4 of high resolution.

However, by making the lens 5 for projecting a picture of the CRT 4 commensurate with the curvature of phosphor screen of the CRT 4, i.e. by making the lens 5 to have a spherical surface of a curvature commensurate with that of the phosphor screen for compensating for a picture, displayed on the spherical phosphor screen, which in turn is projected upon an ideal flat imaging plane, a picture displayed on the CRT 4 can be made approximately identical with an image formed on an ideal flat imaging plane.

Figure 3A:
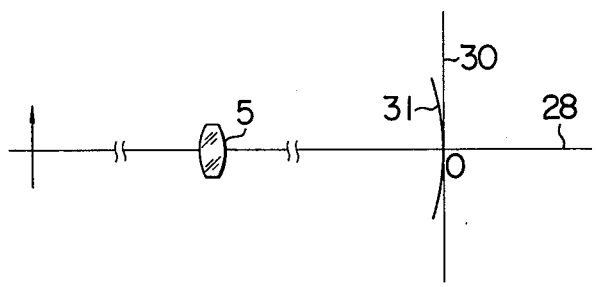
FIGS. 3a to 3c are diagramatic representations useful to explain imaging of an optical lens system.
Figure 3B:
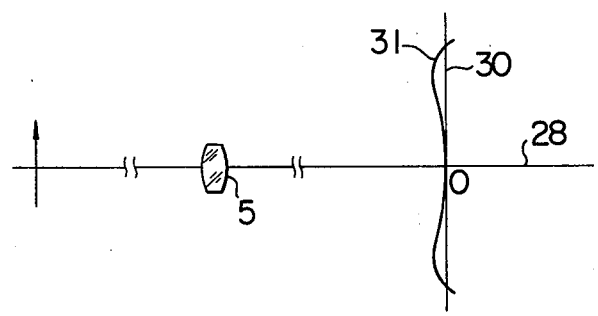
Figure 3C:
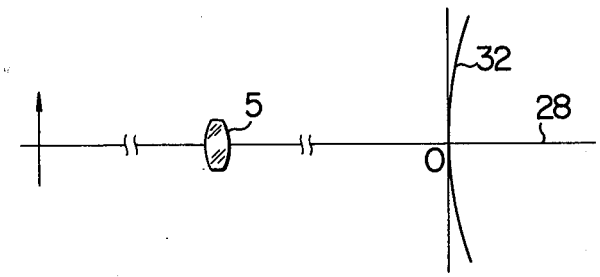
Figure 4:
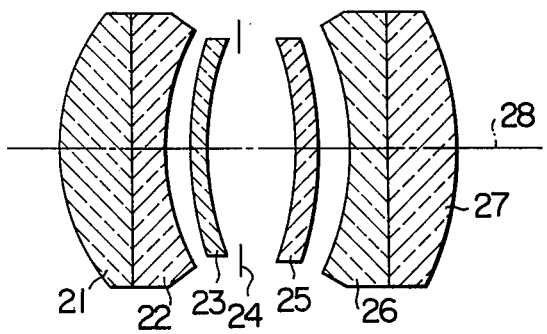
FIG. 4 is a schematic diagram of an optical lens system embodying the invention.

With reference to FIGS. 3 and 4, an optical lens having such imaging characteristics will be described in greater detail.

In the case where a flat object is projected upon a flat imaging plane with a usual lens, when the height of the object is small as shown in FIG. 3a, an actual imaging plane 31 at an ideal flat imaging 30 is curved and it takes the form of concave surface toward the lens. However, as the height of the object increases as shown in FIG. 3b, the actual imaging plane 31 is curved to the ideal imaging 30 with the result that the actual imaging plane 31 as a whole approaches the ideal imaging plane 30.

On the other hand, since a lens which projects a spherical surface object upon a flat plane is equivalent to a lens which projects a flat plane object upon a spherical surface, there is provided, as shown in FIG. 3c, a lens for forming an image on an actual curved imaging surface 32 which is convex toward the lens, the actual curved imaging surface 32 being commensurate with the spherical phosphor screen 4a of the CRT 4. In this manner, it is possible to correctly project an object or a picture displayed on the spherical phosphor screen 4a of the CRT 4 upon the ideal flat imaging plane. One example of a lens for effecting such a function is illustrated in FIG. 4. It is seen from the figure that the first lens 21 and the sixth lens 27 are positive lenses having a relatively strong refractive power, the second lens 21 and the fifth lens 26 are negative lenses, and the third lens 23 and fourth lens 25 are positive lenses having a relatively weak refractive power. The first lens 21 and second lens 22 are coupled, and the fifth lens 26 and sixth lens 27 are also coupled. The first, second and third lenses are arranged to oppose the fourth, fifth and sixth lenses along with an aperture 24 interposed therebetween. Numeral 28 designates the optical axis of the lens system.

Correcting means for compensating for reduction in illumination intensity of a projected image at its peripheral portion will be described hereunder.

Figure 5:
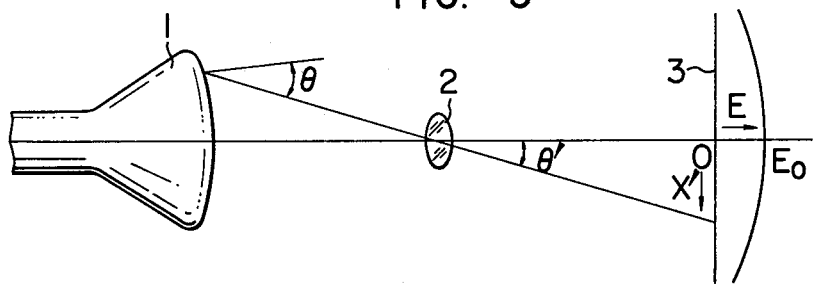
FIG. 5 is a diagramatic representation useful to explain the illumination intensity of a picture to be projected.

Referring now to FIG. 5, the principle on which the present invention is based is as follows.

Distribution of luminous flux emanating from a bright spot on the CRT 1 is proportional to $COS^2\theta$, and the quantity of light at periphery of the lens 2 decreases in proportion to $\cos^4\theta'$, where $\theta$ represents an angle between the normal to the panel of the CRT 1 and a luminous flux toward the lens 2 and $\theta'$ an angle between the optical axis of the lens 2 and the luminous flux.

In consequence, illumination intensity distribution on the imaging plane 3 is given by, $$E = Eo/(1 + AX'^2 + BX'^4)$$

where $E$ represents illumination intensity, $Eo$ illumination intensity on the optical axis, $X'$ distance between a projecting point and the optical axis on the imaging plane, and A and B proportional constants. ($A >> B$).

Accordingly, in order to equalize illumination intensity at a peripheral portion of imaging plane 3 to that at center portion thereof, it is necessary to make the brightness of a picture displayed on the CRT 1 substantially proportional to $(1 + AX^2 + BX^4)$, where $X$ represents a distance between a bright spot and the optical axis on the CRT.

Figure 6:
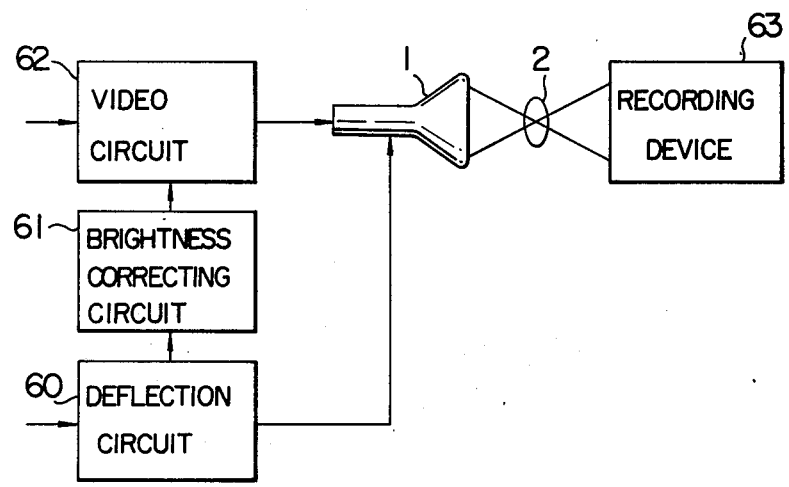
FIG. 6 is a block diagram of a brightness correction arrangement.

With reference to FIG. 6, illustrating a block diagram of one embodiment of a CRT picture recording apparatus according to the present invention, a signal from a deflection circuit 60 of the CRT 1 operates a brightness correcting circuit 61 whose output is applied to a video circuit 62, so that a brightness signal corrected in accordance with deflecting positions is added to a video signal of the CRT 1. With this arrangement, a picture displayed on the CRT 1 is recorded on a recording device 63 through the lens 2.

Figure 7:
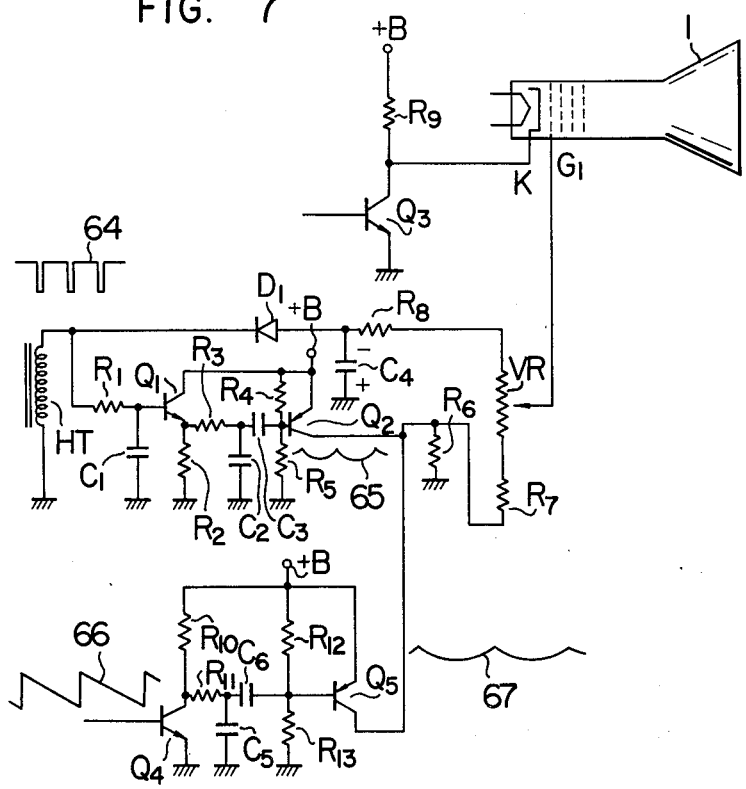
FIG. 7 is a circuit diagram of FIG. 6.

There is shown in FIG. 7 one example of a circuit diagram of the brightness correcting circuit 61, video circuit 62 and CRT 1 shown in FIG. 6.

In FIG. 7, symbol HT designates an output winding of a horizontal output transformer, K a cathode of the CRT 1, G1 the first grid of the same, Q1 to Q5 transistors, C1 to C6 capacitors, R1 to R13 resistors, VR a variable resistor, and +B a power supply.

With this construction, across the output winding HT of the horizontal output transformer incorporated in the deflecting circuit 60 of FIG. 6 is created a negative pulse voltage signal 64 the period of which is identical to a horizontal deflection period. The signal 64 is converted into a parabolic voltage signal 65, the period of which is identical to a horizontal deflection period, by means of a circuit including the resistors R1 to R5, capacitors C1 to C3, and transistors Q1 and Q2. That is, by integrating twice the pulse voltage signal 64 through an integrator including two of sets of resistor R1 and capacitor C1, and resistor R3 and capacitor C2, the parabolic voltage signal 64 is obtained at the base of the transistor Q2, which parabolic voltage signal is in turn applied to the resistor R6 connected to the collector of the transistor Q2.

On the other hand, a vertical deflection voltage signal 66 of vertical deflection period is applied to the base of the transistor Q4, and it is converted into a parabolic voltage signal 67 of vertical deflection period through a circuit including the resistors R10 to R13, capacitors C5 and C6, and transistors Q4 and Q5. That is to say, by integrating the voltage signal 66 through an integrator circuit including the resistor R11 and capacitor C5, the parabolic voltage signal 67 of vertical deflection period is created across the resistor R6 connected to the collector of the transistor Q5.

Thus, across the resistor R6 are developed the parabolic voltage signal 65 of horizontal deflection period and the parabolic voltage signal 67 of vertical deflection period.

Additionally, an output voltage from the output winding HT of the horizontal output transformer is smoothed by the diode D1 and capacitor C4 so as to produce a negative voltage. A resultant voltage of this negative voltage and the parabolic voltages appearing across the resistor R6, which is obtained by the resistors R7 and R8 and variable resistor VR, is applied to the first grid G1 of the CRT 1. On the other hand, to the cathode K of the CRT 1 is applied a video output from the video output transistor Q3 of the video circuit 62 shown in FIG. 6.

A voltage to the first grid G1 is rendered negative by the resistor R7 irrespective of values of the variable resistor VR, and a bright spot of the CRT 1 luminesces when an output of the transistor Q3, i.e. a voltage at the cathode K becomes lower than the voltage of the first grid G1. The more the first grid G1 becomes negative, the more dark the bright spot is. The smaller a negative voltage at the first grid G1 becomes, the more bright the bright spot is. In other words, brightness is proportional to a cathodegrid voltage.

In this manner, during horizontal and vertical deflection periods, to the first grid G1 are applied parabolic voltage signals 65 and 67 which are low at the center of deflection and high at peripheral portions of deflection. Thus, bright spots on the CRT 1 become more bright from the center of the CRT toward peripheral portion thereof. The amount of this brightness correction can be made square proportional to a distance between the center of the CRT panel and the peripheral portion thereof.

Figures 8A, 8B:
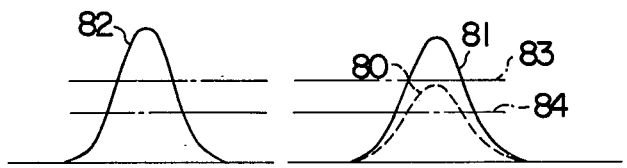
FIGS. 8a and 8b are diagramatic representations of illumination distribution.

As described above, brightness of the bright spot image on the imaging plane of the recording device is depicted as shown in FIGS. 8a and 8b.

More particularly, FIG. 8a shows illumination distribution of the bright spot images on the central portion of the imaging plane, and FIG. 8b shows illumination distribution of the bright spot images on the peripheral portion of the same, wherein dotted curved line 80 corresponds to the illumination distribution obtained when the brightness correction is omitted and solid curved line 81 corresponds to the illumination distribution obtained when the brightness correction is effected in accordance with the present invention.

As understood from the figures, peak of the illumination distribution at the peripheral portion obtained when no brightness correction is effected is far smaller, as shown at dotted curved line 80, than that of the illumination distribution 82 at the central portion shown in FIG. 8a. As a result, for exposure level 83, the recording of the bright spot images is possible at the central portion but impossible at the peripheral portion, and for exposure level 84, the recording at the peripheral portion becomes possible, while recording width for the central portion increases, thereby impairing resolution at the central portion and preventing its practical use.

In contrast therewith, the illumination distribution with brightness correction, as shown at solid curved line 81, is substantially identical with the illumination distribution 82 at the central portion, and for exposure level 83, substantially identical recording can be effected at both the central portion and the peripheral portion.

While, in the foregoing, one embodiment has been described wherein the brightness correction is effected in both the longitudinal and transverse directions of the picture, the same effect may be brought about when the brightness correction is effected in one direction of the picture.

As has been described, according to the present invention, there is provided an inexpensive CRT picture recording apparatus capable of recording uniformly picture images at both central portion and peripheral portion.

We claim:

1. An apparatus for projecting a cathode-ray tube display onto a flat imaging plane comprising a cathode-ray tube having a curved phosphor screen, said cathode-ray tube including means for displaying a picture on said curved screen, wherein said means for displaying said picture includes means for controlling the brightness of said phosphor screen of said cathode-ray tube to be substantially the same at the peripheral portion and at the central portion, and optical means for projecting said picture on said curved screen onto a flat imaging plane, said optical means having imaging properties for imaging a flat object plane onto a curved imaging surface with a central portion of said curved imaging surface being convex toward said optical means, such that an image of said picture on said curved screen is imaged on said flat imaging plane, and wherein said means for controlling the brightness of said phosphor screen of said cathode-ray tube includes first circuit means for producing in accordance with a horizontal synchronizing signal a first parabolic output voltage which increases from the center of deflection to the peripheral portions of deflection for a horizontal scan period, and second circuit means for producing in accordance with a vertical synchronizing signal a second parabolic output voltage which increases from the center of deflection to the peripheral portions of deflection for a vertical scan period, said parabolic output voltages of said first and second circuit means forming control signals to control the brightness of said phosphor screen.

2. An apparatus according to claim 1, wherein a photosensitive recording medium is situated at said flat imaging plane.

3. An apparatus according to claim 2, wherein the photosensitive medium is transported to said imaging plane by means of a transport belt.

4. An apparatus according to claim 1, wherein said first circuit means includes first integrating means for intergrating twice an input signal corresponding to said horizontal synchronizing signal to produce said first parabolic output signal, and wherein said second circuit means includes second integrating means for integrating an input signal corresponding to said vertical synchronizing signal to produce said second parabolic output signal.

5. An apparatus according to claim 1, wherein said optical means includes lens means for projecting and imaging said picture on said curved screen onto said flat imaging plane.

6. An apparatus according to claim 5, wherein said lens means includes a lens system being constituted in sequence along the optical axis by a first positive lens having a strong refractive power, a first negative lens, a second positive lens having a weaker refractive power, a third positive lens having a weaker refractive power, a second negative lens, and a fourth positive lens having a strong refractive power, and wherein said first positive lens, said first negative lens and said second positive lens are arranged to oppose said third positive lens, said second negative lens, and said fourth positive lens with an aperture therebetween.

* * * * *